Figure 1:
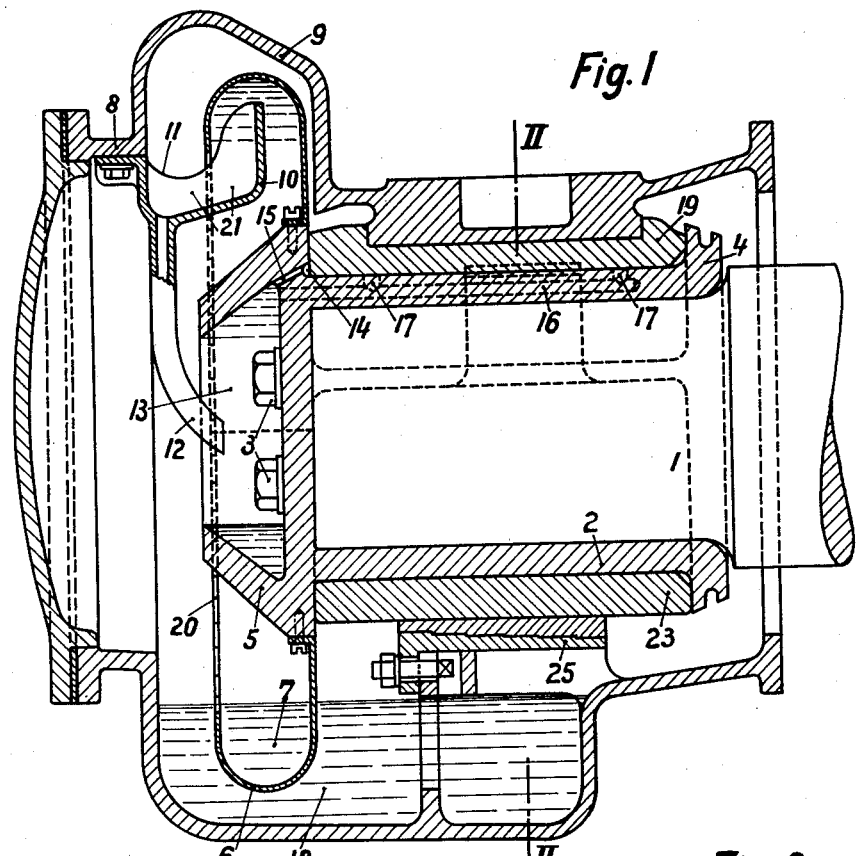

Aug. 8, 1933. V. A. BARY 1,921,339

AXLE BEARING

Filed July 26, 1932

Inventor:
Victor Alexander
Bary

Patented Aug. 8, 1933

1,921,339

UNITED STATES PATENT OFFICE 1,921,339

AXLE BEARING

Victor Alexander Bary, Hendon, London, England

Application July 26, 1932, Serial No. 624,665, and in Germany July 31, 1931

28 Claims. (Cl. 308—86)

Methods of lubricating axle bearings, especially on railroad vehicles, are already known in which the lubricant, from a source of supply is, under the rotary action of the axle end or journal, converted into a ring of lubricant from which lubricant is then taken and directed to the places where lubricant is to be applied. It has also been proposed to utilize the energy of flow of the rotating ring of lubricant to deliver the lubricant under pressure to the place where it is to be used. The devices for carrying out these methods employ fixed parts of the axle bearing for carrying the lubricant into the bearing, while the present invention has for its object to solve the problem of working the method in such a way that the lubricant is delivered under pressure directly to rotating parts of the axle bearing, by means of which parts it can be introduced immediately between the bearing surfaces. It is characteristic of the invention that lubricant is converted into a ring of lubricant in known manner by the action of the rotating axle end and that lubricant is then picked up from the rotating lubricant ring, the lubricant so picked up being again subjected to the action of the rotating axle end, so that it can be delivered to the bearing surfaces under a correspondingly high pressure. Axle bearings according to the invention are characterized by an annular trough rotating with the axle end, into the hollow of which trough there dips a fixed lead-off duct for the lubricant, this lead-off duct communicating with the interior of a receptacle which rotates with the axle end, is uncovered at least peripherally and is preferably conical. The fixed lead-off duct together with the member for transferring the lubricant to the hollow chamber of the receptacle, may conveniently be fastened to the casing. In a manner known per se, the receptacle may be made funnel-shaped. A particularly simple constructional form of the apparatus results if the receptacle be formed as a cylindrical box or bush fixed to the axle end, preferably by being shrunk on to it; this bush may also, at the same time constitute the splash ring. This arrangement affords the possibility of using again axle ends or journals which by reason of having been worn and trued up again, have been subjected to a change of diameter greater than the maximum; for this purpose bushes which restore the original strength of the journal are drawn on to the correspondingly turned down axle end. It is of the essence of this inventive conception that it remains independent of the method of lubrication that may happen to be in use. In order that the axle end may not be weakened unnecessarily the ducts leading from the hollow chamber of the receptacle to the bearing surfaces may be arranged exclusively in the bush and, in a manner already proposed per se, they may open into the receptacle in the vicinity of the peripheral uncovering; preferably in the enlarged base of a funnel-shaped receptacle.

The drawing illustrates by way of example one construction according to the idea of the invention.

Figure 2:
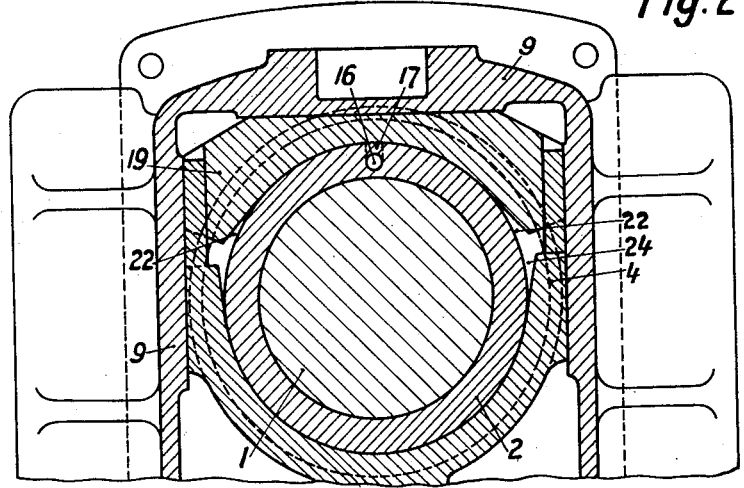

Fig. 1 is a vertical longitudinal section through a bearing constructed according to the invention, while Fig. 2 is a vertical transverse section on line II—II of Fig. 1.

In both figures 1 designates the axle end or journal which is stiffened by the cylindrical bush 2, shrunk on to it. Supplementary securing means are afforded by fixing screws 3. At 4 the bush 2 also forms a splash ring, while its opposite end face is formed into a conical receptacle 5 having its wider base turned towards the end of the axle journal and rotating with the latter. To the conical receptacle an annular trough 6 is connected in any suitable manner. Into the hollow chamber 7 of the annular trough 6 there dips a fixed lead-off duct for the lubricant, this duct being secured at 8 to the casing 9. At 11 this lead-off duct has a rib which assists in guiding the lubricant to the connecting pipe 12. The rib 11 is in the middle of the duct 21 formed by the member 10 so that the rib 11 acts in the same manner independently of the direction of rotation of the trough 6. This connecting pipe opens out of the deepest part of the lead-off duct 10 and is extended into the hollow-chamber 13 of the conical receptacle 5. In the bush 2 there are provided either annular recesses 14 connected with short transfer passages 15 or longitudinal passages 16 with short transverse passages 17, or both systems of passages.

Between the casing 9 and the steel bush 2 is the bearing liner 19 which has wedge-shaped inlet spaces 22. The axle journal or the bush 2 is supported from underneath by a bottom liner 23 which also has wedge-shaped inlet spaces 24. A supporting member holds up the bottom liner shell from the casing 9 of the bearing. The supporting member consists in known manner of two wedge-shaped parts, so that by displacing the steps 25, formed in the inclined dividing surfaces, it is possible to adjust the bottom liner shell relatively to the axle journal.

The arrangement described works in the following manner. Under the action of the rotating axle journal a ring of lubricant is formed in the annular trough 6 from the lubricant taken from the supply 18. The lubricant runs down the fixed nose 10 or down the rib 11 thereof as soon as the lead-off duct 10 dips into the ring of lubricant. From the lead-off duct 10 the lubricant passes by way of the connecting pipe 12 into the hollow chamber 13 of the rotating conical receptacle 5. Under the rotary action of the axle journal it again assumes an annular form in this receptacle and thus, by reason of the effect of centrifugal force, penetrates to the bearing surfaces between the axle journal 1 and the bearing liner 19 there to exercise its lubricating function. It reaches the bearing surfaces either by way of the passages 15 and 14 or by way of the passages 16 and 17 or through both sets of passages.

In place of the lead-off duct 10 it is equally satisfactory to use a choke pipe which is extended directly into the hollow chamber 13. It is advantageous to provide the annular trough 6 with tooth-like projections, so that at low speeds of rotation the lubricant actually drips off and enters the lead-off duct, which at 21 is formed like a tray, by drip feed, from which tray it passes to the hollow chamber 13 and thence to the bearing surfaces.

I claim:

1. In an axle journal bearing a journal, bearing means therefor, a casing enclosing said journal and bearing means, said casing including a lubricant containing sump, rotary means for withdrawing lubricant from said sump and forming the withdrawn lubricant into an annular rotating body, means for abstracting lubricant from said annular rotating body of lubricant, means for subjecting the lubricant so abstracted to centrifugal action and means for delivering such lubricant directly to the bearing surfaces under the pressure set up by such centrifugal action.

2. In an axle journal bearing a journal, bearing means therefor, a casing enclosing said journal and bearing means, said casing including a lubricant containing sump, rotary means for withdrawing lubricant from said sump and forming the withdrawn lubricant into an annular rotating body, means for abstracting lubricant from said annular rotating body of lubricant, means for subjecting the lubricant so abstracted to the rotary action of the journal and means for delivering such lubricant directly to the bearing surfaces under the pressure set up by such rotary journal action.

3. In an axle journal bearing a journal, bearing means therefor, a casing enclosing said journal and bearing means, said casing including a lubricant containing sump an annular trough dipping in said sump and rotative in response to rotation of said journal to raise lubricant from said sump means for abstracting from said trough a part of the lubricant raised thereby from said sump, means for subjecting the lubricant so abstracted to centrifugal action and means for delivering such lubricant directly to the bearing surfaces under the pressure set up by such centrifugal action.

4. In an axle journal bearing a journal, bearing means therefor, a casing enclosing said journal and bearing means, said casing including a lubricant containing sump, an annular trough dipping in said sump and rotative in response to rotation of said journal to raise lubricant from said sump means for abstracting from said trough a part of the lubricant raised thereby from said sump, means for subjecting the lubricant so abstracted to the rotary action of the journal and means for delivering such lubricant directly to the bearing surfaces under the pressure set up by such rotary journal action.

5. In an axle journal bearing a journal, a cylindrical bush surrounding said journal and rotative therewith, said bush including an annular cavity extending beyond the journal end, bearing means embracing said journal and bush, a casing surrounding said journal, bush and bearing means, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said cylindrical rotating bush and ducts connecting said annular cavity with the bearing surfaces to be lubricated.

6. In an axle journal bearing a journal, a cylindrical bush surrounding said journal and rotative therewith, said bush including an annular cavity extending beyond the journal end, bearing means embracing said journal and bush, a casing surrounding said journal, bush and bearing means, said casing including a lubricant containing sump, an annular trough dipping in said sump and rotative in response to rotation of said journal to raise lubricant from said sump means for abstracting from said trough a part of the lubricant raised thereby from said sump, means for directing the lubricant so abstracted into the annular cavity of said cylindrical rotating bush and ducts connecting said annular cavity with the bearing surfaces to be lubricated.

7. In an axle journal bearing a journal, a cylindrical bush surrounding said journal and rotative therewith, said bush including an annular cavity extending beyond the journal end, bearing means embracing said journal and bush, a casing surrounding said journal, bush and bearing means, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said cylindrical rotating bush and ducts in said bush connecting said annular cavity with the bearing surfaces to be lubricated.

8. In an axle journal bearing a journal, a cylindrical bush surrounding said journal and rotative therewith, said bush including an annular cavity extending beyond the journal end, bearing means embracing said journal and bush, a casing surrounding said journal, bush and bearing means, said casing including a lubricant containing sump, an annular trough dipping in said sump and rotative in response to rotation of said journal to raise lubricant from said sump means for abstracting from said trough a part of the lubricant raised thereby from said sump, means for directing the lubricant so abstracted into the annular cavity of said cylindrical rotating bush and ducts in said bush connecting said annular cavity with the bearing surfaces to be lubricated.

9. In an axle journal bearing a journal, a cylindrical bush surrounding said journal and rotative therewith, said bush being extended beyond the journal end in the form of a conical receptacle having its broader base adjacent said journal end, bearing means embracing said journal and bush, a casing surrounding said journal, bush and bearing means, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said conical receptacle and ducts connecting said annular cavity with the bearing surfaces to be lubricated.

10. In an axle journal bearing a journal, a cylindrical bush surrounding said journal and rotative therewith, said bush being extended beyond the journal end in the form of a conical receptacle having its broader base adjacent said journal end, bearing means embracing said journal and bush, a casing surrounding said journal, bush and bearing means, said casing including a lubricant containing sump, an annular trough dipping in said sump and rotative in response to rotation of said journal to raise lubricant from said sump means for abstracting from said trough a part of the lubricant raised thereby from said sump, means for directing the lubricant so abstracted into the annular cavity of said conical receptacle and ducts connecting said annular cavity with the bearing surfaces to be lubricated.

11. In an axle journal bearing a journal, a cylindrical bush surrounding said journal and rotative therewith, said bush being extended beyond the journal end in the form of a conical receptacle having its broader base adjacent said journal end, bearing means embracing said journal and bush, a casing surrounding said journal, bush and bearing means, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said conical receptacle and ducts in the cylindrical part of said bush connecting said annular cavity with the bearing surfaces to be lubricated.

12. In an axle journal bearing a journal, a cylindrical bush surrounding said journal and rotative therewith, said bush being extended beyond the journal and in the form of a conical receptacle having its broader base adjacent said journal end, bearing means embracing said journal and bush, a casing surrounding said journal, bush and bearing means, said casing including a lubricant containing sump, an annular trough dipping in said sump and rotative in response to rotation of said journal to raise lubricant from said sump means for abstracting from said trough a part of the lubricant raised thereby from said sump, means for directing the lubricant so abstracted into the annular cavity of said conical receptacle and ducts in said bush connecting said annular cavity with the bearing surfaces to be lubricated.

13. In an axle journal bearing a journal, a cylindrical bush surrounding said journal and rotative therewith, said bush including an annular cavity extending beyond the journal end, bearing means embracing said journal and bush, a casing surrounding said journal, bush and bearing means, said casing including a lubricant containing sump, an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said cylindrical rotating bush and ducts connecting said annular cavity with the bearing surfaces to be lubricated.

14. In an axle journal bearing a journal, a cylindrical bush surrounding said journal and rotative therewith, said bush being extended beyond the journal end in the form of a conical receptacle having its broader base adjacent said journal end, bearing means embracing said journal and bush, a casing surrounding said journal, bush and bearing means, said casing including a lubricant containing sump, an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said conical receptacle and ducts connecting said annular cavity with the bearing surfaces to be lubricated.

15. In an axle journal bearing a journal, a cylindrical bush surrounding said journal and rotative therewith, said bush being extended beyond the journal end in the form of a conical receptacle having its broader base adjacent said journal end, bearing means embracing said journal and bush, a casing surrounding said journal, bush and bearing means, said casing including a lubricant containing sump, an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said conical receptacle and ducts in said bush connecting said annular cavity with the bearing surfaces to be lubricated.

16. In an axle journal bearing, a rotary journal, a cylindrical bush surrounding said journal and fixed thereto, said bush including at one end an annular cavity extending beyond the journal end and at the other end a splash ring, bearing liners embracing said bush and journal, a casing surrounding said liners bush and journal, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said cylindrical rotating bush and ducts connecting said annular cavity with the opposing bearing surfaces of the journal and liners.

17. In an axle journal bearing, a rotary journal, a cylindrical bush surrounding said journal and fixed thereto, said bush including at one end an annular cavity extending beyond the journal end and at the other end a splash ring, bearing liners embracing said bush and journal, a casing surrounding said liners bush and journal, said casing including a lubricant containing sump, an annular trough dipping in said sump and rotative in response to rotation of said journal to raise lubricant from said sump means for abstracting from said trough a part of the lubricant raised thereby from said sump means for directing the lubricant so abstracted into the annular cavity of said cylindrical rotating bush and ducts connecting said annular cavity with the opposing bearing surfaces of the journal and liners.

18. In an axle journal bearing, a rotary journal, a cylindrical bush surrounding said journal and fixed thereto, said bush including at one end an annular cavity extending beyond the journal end and at the other end a splash ring, bearing liners embracing said bush and journal, a casing surrounding said liners bush and journal, said casing including a lubricant containing sump, an annular trough dipping in said sump and rotative in response to rotation of said journal to raise lubricant from said sump means for abstracting from said trough a part of the lubricant raised thereby from said sump, means for directing the lubricant so abstracted into the annular cavity of said cylindrical rotating bush and ducts in said bush connecting said annular cavity with the opposing bearing surfaces of the journal and liners.

19. In an axle journal bearing, a rotary journal, a cylindrical bush surrounding said journal and fixed thereto, said bush being at one end extended beyond the end of the journal in the form of a conical receptacle having its broader base adjacent said journal end and at the other end formed into a splash ring, bearing liners embracing said bush and journal, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said conical receptacle and ducts connecting said annular cavity with the opposing bearing surfaces of the journal and liners.

20. In an axle journal bearing, a rotary journal, a cylindrical bush surrounding said journal and fixed thereto, said bush including at one end an annular cavity extending beyond the journal end and at the other end a splash ring, bearing liners embracing said bush and journal, a casing surrounding said liners bush and journal, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said cylindrical rotating bush and ducts in said bush connecting said annular cavity with the opposing bearing surfaces of the journal and liners.

21. In an axle journal bearing, a rotary journal, a cylindrical bush surrounding said journal and fixed thereto, said bush being at one end extended beyond the end of the journal in the form of a conical receptacle having its broader base adjacent said journal end and at the other end formed into a splash ring, bearing liners embracing said bush and journal, a casing surrounding said liners bush and journal, said casing including a lubricant containing sump an annular trough dipping in said sump and rotative in response to rotation of said journal to raise lubricant from said sump means for abstracting from said trough a part of the lubricant raised thereby from said sump, means for directing the lubricant so abstracted into the annular cavity of said conical receptacle and ducts connecting said annular cavity with the opposing bearing surfaces of the journal and liners.

22. In an axle journal bearing, a rotary journal, a cylindrical bush surrounding said journal and fixed thereto, said bush being at one end extended beyond the end of the journal in the form of a conical receptacle having its broader base adjacent said journal end and at the other end formed into a splash ring, bearing liners embracing said bush and journal, a casing surrounding said liners bush and journal, said casing including a lubricant containing sump, rotary means for withdrawing lubricant from said sump and forming the withdrawn lubricant into an annular rotating body of lubricant, means for abstracting lubricant from said annular rotating body of lubricant, means for directing the lubricant so abstracted into the annular cavity of said conical receptacle and ducts in the cylindrical part of said bush connecting said annular cavity with the opposing bearing surfaces of the journal and liners.

23. In an axle journal bearing, a rotary journal, a cylindrical bush surrounding said journal and fixed thereto, said bush being at one end extended beyond the end of the journal in the form of a conical receptacle having its broader base adjacent said journal end and at the other end formed into a splash ring, bearing liners embracing said bush and journal, a casing surrounding said liners bush and journal, said casing including a lubricant containing sump, an annular trough dipping in said sump and rotative in response to rotation of said journal to raise lubricant from said sump means for abstracting from said trough a part of the lubricant raised thereby from said sump, means for directing the lubricant so abstracted into the annular cavity of said conical receptacle and ducts in said bush connecting said annular cavity with the opposing bearing surfaces of the journal and liners.

24. In an axle journal bearing, a rotary journal, a cylindrical bush surrounding said journal and fixed thereto, said bush including at one end an annular cavity extending beyond the journal end and at the other end a splash ring, bearing liners embracing said bush and journal, a casing surrounding said liners bush and journal, said casing including a lubricant containing sump, an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said cylindrical rotating bush and ducts connecting said annular cavity with the opposing bearing surfaces of the journal and liners.

25. In an axle journal bearing, a rotary journal, a cylindrical bush surrounding said journal and fixed thereto, said bush being at one end extended beyond the end of the journal in the form of a conical receptacle having its broader base adjacent said journal end and at the other end formed into a splash ring, bearing liners embracing said bush and journal, a casing surrounding said liners bush and journal, said casing including a lubricant containing sump an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said conical receptacle and ducts connecting said annular cavity with the opposing bearing surfaces of the journal and liners.

26. In an axle journal bearing, a rotary journal, a cylindrical bush surrounding said journal and fixed thereto, said bush being at one end extended beyond the end of the journal in the form of a conical receptacle having its broader base adjacent said journal end and at the other end formed into a splash ring, bearing liners embracing said bush and journal, a casing surrounding said liners bush and journal, said casing including a lubricant containing sump, an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said conical receptacle and ducts in said bush connecting said annular cavity with the opposing bearing surfaces of the journal and liners.

27. In an axle journal bearing, a rotary journal, a cylindrical bush surrounding said journal and fixed thereto, said bush including at one end an annular cavity extending beyond the journal end and at the other end a splash ring, bearing liners embracing said bush and journal, a casing surrounding said liners bush and journal, said casing including a lubricant containing sump, an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said cylindrical rotating bush and ducts in said bush connecting said annular cavity with the opposing bearing cavity with the opposing bearing surfaces of the journal and liners.

28. In an axle journal bearing a journal, a cylindrical bush surrounding said journal and rotative therewith, said bush including an annular cavity extending beyond the journal end, bearing means embracing said journal and bush, a casing surrounding said journal, bush and bearing means, said casing including a lubricant containing sump, an annular trough rotative with said journal and operative to entrain lubricant in said sump, fixed means for abstracting from said trough a part of the lubricant entrained therein, means associated with said fixed abstracting means for directing the lubricant so abstracted into the annular cavity of said cylindrical rotating bush and ducts in said bush connecting said annular cavity with the bearing surfaces to be lubricated.

VICTOR ALEXANDER BARY.